United States Patent
Wu et al.

(10) Patent No.: US 12,096,304 B2
(45) Date of Patent: Sep. 17, 2024

(54) CONTROLLING MOBILITY BETWEEN BASE STATIONS OF DIFFERENT TYPES

(71) Applicant: GOOGLE LLC, Mountain View, CA (US)

(72) Inventors: Chih-Hsiang Wu, Taoyuan (TW); Teming Chen, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 321 days.

(21) Appl. No.: 17/635,373

(22) PCT Filed: Aug. 11, 2020

(86) PCT No.: PCT/US2020/045709
§ 371 (c)(1),
(2) Date: Feb. 14, 2022

(87) PCT Pub. No.: WO2021/030318
PCT Pub. Date: Feb. 18, 2021

(65) Prior Publication Data
US 2022/0279415 A1    Sep. 1, 2022

Related U.S. Application Data (60) Provisional application No. 62/886,694, filed on Aug. 14, 2019.

(51) Int. Cl.
*H04W 36/32*    (2009.01)
*H04W 36/08*    (2009.01)
(Continued)

(52) U.S. Cl.
CPC .......... *H04W 36/32* (2013.01); *H04W 36/08* (2013.01); *H04W 76/20* (2018.02); *H04W 76/30* (2018.02)

(58) Field of Classification Search
CPC ..... H04W 36/32; H04W 76/20; H04W 76/30; H04W 36/08
See application file for complete search history.

(56) References Cited

U.S. PATENT DOCUMENTS

2018/0220344 A1* 8/2018 Shaheen ................. H04W 4/60
2019/0357097 A1* 11/2019 Rugeland .......... H04W 36/0069
(Continued)

FOREIGN PATENT DOCUMENTS

| CN | 103535071 B | 2/2017 |
| WO | WO-2012/040918 A1 | 4/2012 |

OTHER PUBLICATIONS

"3rd Generation Partnership Project: Technical Specification Group Radio Access Network; Evolved Universal Terrestrial Radio Access (E-UTRA) and Evolved Universal Terrestrial Radio Access Network (E-UTRAN); Overall Description; Stage 2 (Release 15)," 3GPP Draft (2018).

(Continued)

*Primary Examiner* — Ronald B Abelson
(74) *Attorney, Agent, or Firm* — MARSHALL, GERSTEIN & BORUN LLP (57) ABSTRACT

A user equipment (UE) for handling mobility between base stations receives, from a source base station, a command to hand over to a target base station, while the UE operates in an mobility management (MM)-connected mode and communicates with the source base station via a radio bearer (1002), determines that the source base station and the target base station operate according to different radio access technologies (RATs) and connect to a same core network (CN) (1004), and in response to an indication that a handover completed in accordance with the command, continues to operate in the MM-connected mode (1006).

18 Claims, 10 Drawing Sheets

(51) Int. Cl.
    *H04W 76/20*     (2018.01)
    *H04W 76/30*     (2018.01)

(56) References Cited

U.S. PATENT DOCUMENTS

2020/0045590 A1*   2/2020   Wu .................... H04W 36/0022
2021/0120446 A1*   4/2021   Zhang ............... H04W 36/0094

OTHER PUBLICATIONS

Ericsson, "Alignment of Terminology and General Cleanup," 3GPP Draft (2018).
Huawei et al., "Fallback Handling for RRC Inactive," 3GPP Draft (2018).
International Search Report and Written Opinion for Application No. PCT/US2020/045709, dated Oct. 7, 2020.
Office Action for Israel Application No. 290552, dated Feb. 29, 2024.
Office Action for Taiwan Application No. 109127785, dated May 18, 2023.

* cited by examiner

CONTROLLING MOBILITY BETWEEN BASE STATIONS OF DIFFERENT TYPES

FIELD OF THE DISCLOSURE

This disclosure relates generally to wireless communications and, more particularly, to procedures for controlling mobility between base stations of different types.

BACKGROUND

According to some types of network architecture, a base station communicates with a user equipment (UE) using a certain radio access technology (RAT), and connects to a core network (CN) to provide the UE with the functionality of the CN.

For example, a next-generation evolved Node B (ng-eNB) supports Evolved Universal Terrestrial Radio Access (EUTRA) and connects to a 5G core network (5GC). In this case, the physical layer (PHY) of EUTRA provides transport channels to the Medium Access Control (MAC) sublayer, which in turn provides logical channels to the Radio Link Control (RLC) sublayer, and the RLC sublayer in turn provides RLC channels to the Packet Data Convergence Protocol (PDCP) sublayer. To support connection to a 5GC, a EUTRA PDCP sublayer provides signaling radio bearers (SRBs) to the Radio Resource Control (RRC) sublayer, and a New Radio (NR) PDCP sublayer provides data radio bearers (DRBs) to the Service Data Adaptation Protocol (SDAP) and SRBs to the RRC sublayer. At the RRC sublayer, 4G and 5G standards in some cases support different functionality.

The UE in a certain configuration supports both EUTRA (or Enhanced Long Term Evolution (eLTE)) and 5G New Radio (NR) radio access technologies (RATs) to communicate both with an ng-eNB and 5G Node (gNB). When the gNB and the ng-eNB connect to the same CN (e.g., 5GC), the UE can transmit 5G Mobility Management (5GMM) Non-Access Stratum (NAS) messages layered over the EUTRA RRC protocol, in turn layered over the NR PDCP protocol, when communicating with the CN via the ng-eNB. When communicating with the CN via the gNB, the UE can transmit 5GMM NAS messages over NR RRC, layered over NR PDCP. Thus, the UE in these scenarios can use the same version of PDCP and 5G mobility management (5GMM) NAS protocols but different versions of the RRC protocol.

Because of this layering, the UE implemented according to 3GPP TS 38.331, v. 15.6.0, in some situations does not efficiently process handover events. For example, when a source base station hands a UE over to a target base station of a different type (e.g., gNB to ng-eNB or ng-eNB to gNB) with the same CN type (e.g., 5GC), in some cases the UE releases an existing radio connection and/or a radio bearer that was available for communicating with the target base station.

SUMMARY

Generally speaking, the techniques of this disclosure allow the UE to properly perform a handover between base stations of different types (e.g., a gNB and an ng-eNB) coupled to the same CN. The UE determines that in these scenarios the UE should continue operating in connected mode rather than transition to idle mode associated with an entity such as MM.

According to implementations described herein, a non-access stratum (NAS) protocol entity of the UE determines whether the UE should continue operating in an connected mode or transition to an idle mode. In one implementation, a mobility management (MM) entity (e.g., a 5GMM entity) of the UE determines whether the UE should continue operating in an MM-connected mode (e.g., 5GMM-CONNECTED) or transition to an MM-idle mode (e.g., 5GMM-IDLE).

In one implementation, an RRC entity corresponding to the RAT of the source base station, after releasing the radio connection to the source base station, does not notify the 5GMM entity and thereby causes the 5GMM entity to continue operating in the 5GMM-CONNECTED mode.

In another implementation, the RRC entity corresponding to the RAT of the source base station provides a notification (e.g., a flag) to the 5GMM entity that the handover involved base stations of different types connected to a same CN.

Yet another implementation involves the 5GMM entity initially transitioning to the 5GMM-IDLE mode and an RRC entity corresponding to the RAT of the target base station then notifying the MM entity that a radio connection is already established.

According to another technique, the UE in some cases receives a full configuration for a radio bearer (e.g., a DRB) as a part of the handover configuration and, after the handover completes, continues to use the radio bearer. To this end, the RRC entity corresponding to the RAT of the source base station determines that the handover occurred between base stations of different types coupled to the same CN and, in response, determines to not cause releasing of the PDCP entity and/or SDAP entity associated to the radio bearer.

One example embodiment of these techniques is a method in a UE for handling mobility between base stations. The method can be executed by processing hardware and comprises receiving, from a source base station, a command to handover to a target base station, while the UE operates in an MM-connected mode and communicates with the source base station via a radio bearer. The method further comprises determining that the source base station and the target base station operate according to different RATs and connect to a same CN. In response to an indication that a handover completed in accordance with the command, the method further comprises continuing to at least one of (i) operate in the MM-connected mode, or use the radio bearer, in accordance with a configuration related to the target base station and received from the source base station.

Yet another example embodiment of these techniques is a UE comprising processing hardware configured to execute the method above.

Still another example embodiment of these techniques is a communication network comprising a first base station that operates according to a first RAT; a second base station that operates according to a second RAT; a CN connected to the first base station and the second base station; and a UE comprising hardware and configured to execute the method above.

DETAILED DESCRIPTION OF THE DRAWINGS

Figure 1:
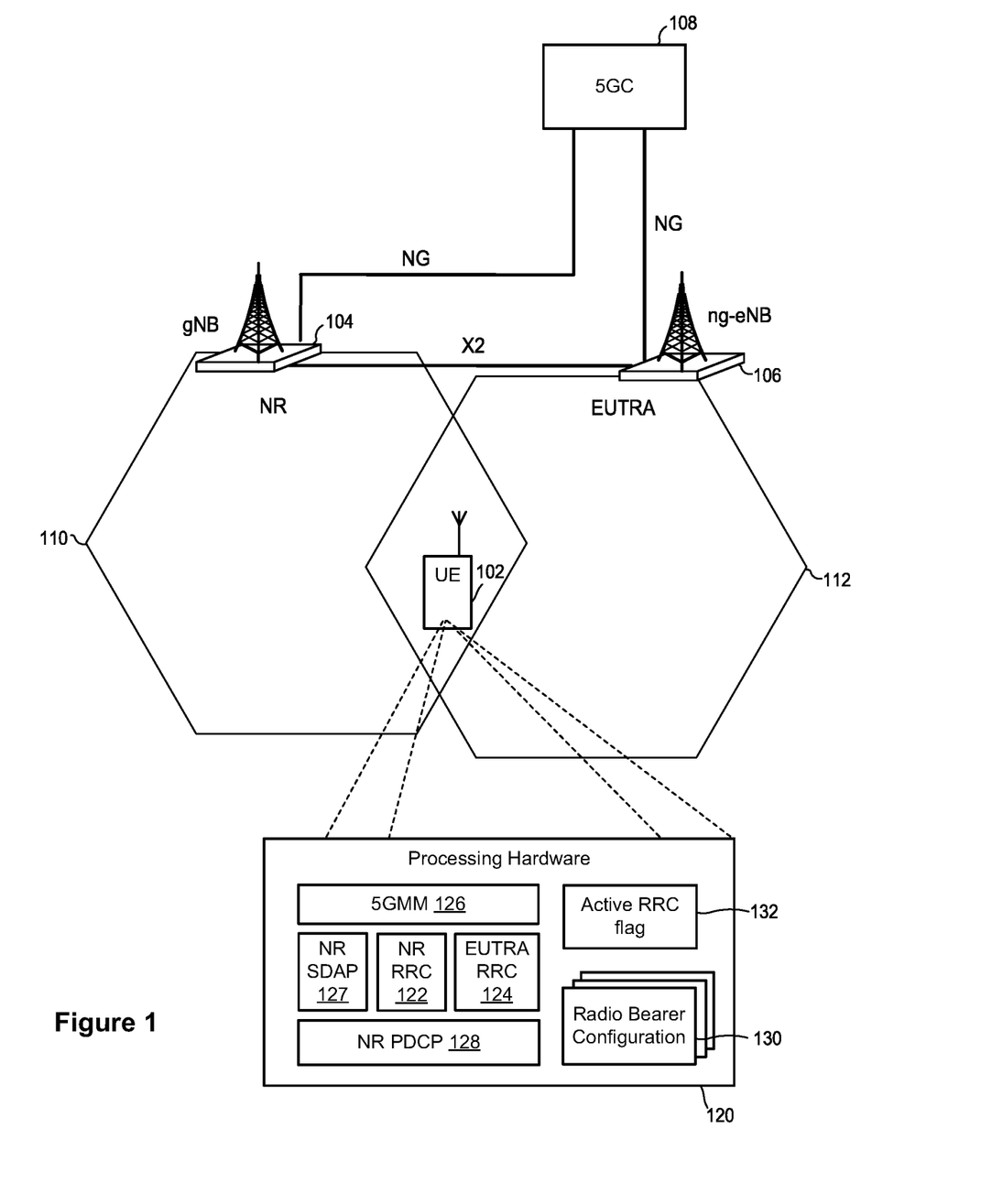
FIG. 1 is a block diagram of an example communication system in which a UE of this disclosure can use the techniques of this disclosure to efficiently handle mobility between base stations supporting different RATs and connected to the same CN.

FIG. 1 depicts an example wireless communication network 100 in which an example UE 102 communicates with a base station of a new radio (NR) network, a gNB 104, and a base station of an enhanced long term evolution (eLTE) network, an ng-eNB 106. The UE 102 and gNB 104 communicate via the NR RAT in a cell 110. The gNB 104 in turn communicates with a 5GC 108 via a Next Generation (NG) interface. Similarly, the UE 102 and ng-eNB 106 communicate via the EUTRA RAT in a cell 112. The ng-eNB 106 in turn communicates with the 5GC 108 via an NG interface. The UE 102 thus can access the functionality of the 5GC 108.

In accordance with the techniques of this disclosure, the UE 102 performs handover between a source base station (e.g., the gNB 104) and a target base station (e.g., the ng-eNB 106) both coupled to the 5GC 108, in a manner in which the UE 102 continues operating in an 5GMM-CONNECTED mode rather than transitioning to the 5GMM-IDLE mode. The detailed description includes specific details for the purpose of providing a thorough understanding of various modes of 5G standard entities. However, it will be clear and apparent to those skilled in the art that the subject technology is not limited to the specific details set forth herein and may be applied to other modes depending on the standard.

As illustrated in FIG. 1, the UE 102 is equipped with processing hardware 120 that can include one or more general-purpose processors such as central processing units (CPUs) and non-transitory computer-readable memory storing machine-readable instructions executable on the one or more general-purpose processors, and/or special-purpose processing units. The processing hardware 120 in an example implementation includes one or more processors that can instantiate, release, and otherwise interact with an NR RRC entity 122, a EUTRA RRC entity 124, a 5GMM entity 126, an NR SDAP entity 127, and an NR PDCP entity 128. The processing hardware 120 also stores one or more radio bearer configurations 130 and an active RRC flag 132.

For clarity, prior to discussing these scenarios in more detail with reference to FIGS. 3-6 and 8, an example user plane protocol stack according to which the UE 102, the gNB 104, and the ng-eNB 106 can communicate is discussed with reference to FIG. 2.

Figure 2:
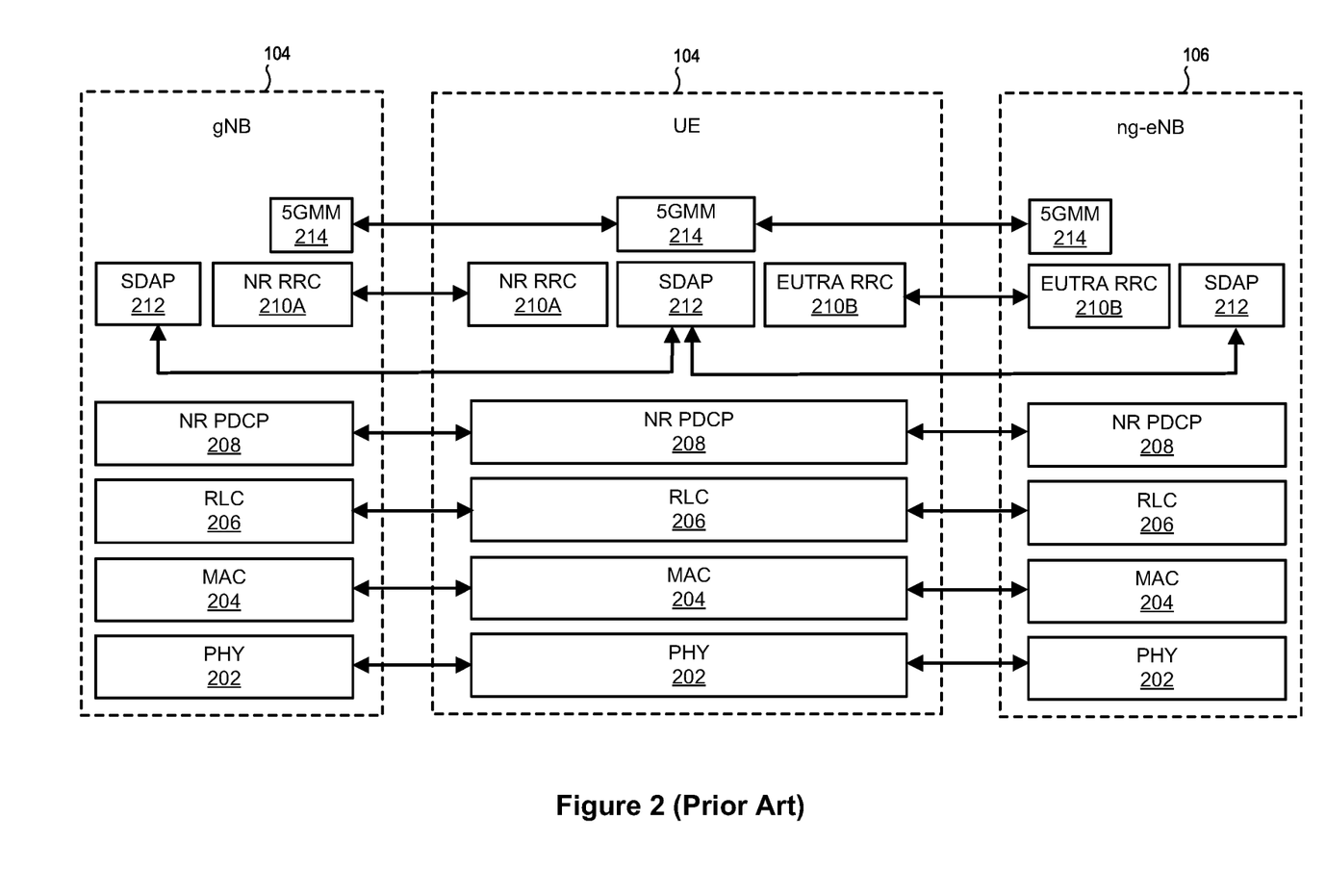
FIG. 2 is a block diagram of protocol stacks according to which the UE of this disclosure can communicate with the base stations of FIG. 1.

Referring to FIG. 2, the processing hardware 120 of the UE 102 and each of the gNB 104 and the ng-eNB 106 can support a PHY sublayer 202, a MAC sublayer 204 layered over the PHY sublayer 202, an RLC sublayer 206 layered over the MAC sublayer 204, and an NR PDCP sublayer 208 layered over the RLC sublayer 206, and an SDAP sublayer 212 over the NR PDCP sublayer 208.

As further illustrated in FIG. 2, the UE 102 and the gNB 104 can transmit NR RRC messages at a sublayer 210A over the NR PDCP sublayer 208. Similarly, the UE 102 and the ng-eNB 106 can transmit EUTRA RRC messages at a sublayer 210B over the NR PDCP sublayer 208. Further, the UE 102 can exchange 5GMM NAS messages with the gNB 104 and the ng-eNB 106 at a NAS sublayer 214.

Figure 3:
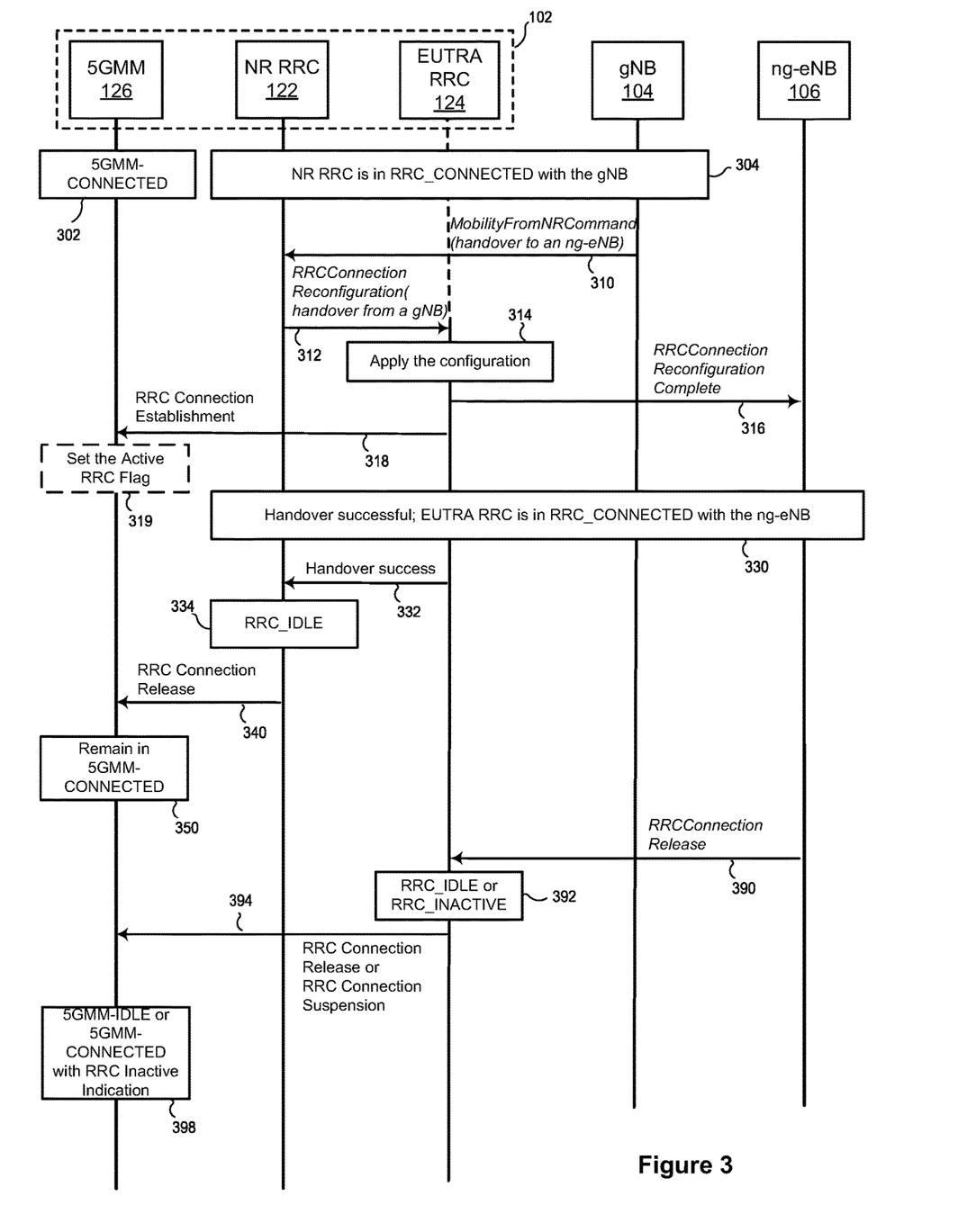
FIG. 3 is a messaging diagram of an example scenario in which an 5GMM entity operating in the UE of FIG. 1 determines that the UE should continue operating in the 5GMM-CONNECTED mode in response to successful completion of a handover from a gNB to a ng-eNB, both connected to a 5GC.

Next, FIG. 3 illustrates an example scenario in which the UE 102 initially is in 5GMM-CONNECTED mode with a source base station (e.g., gNB 104) and thus communicates with the gNB 104 via a radio bearer. That is, entities of the UE 102 for controlling radio resources associated with a RAT according to which the gNB 104 operates is in connected mode with the gNB 104. Specifically, the 5GMM entity 126 of the UE 102 is in 5GMM-CONNECTED state 302, and the NR RRC entity 122 of the UE 102 is in NR RRC_CONNECTED state 304.

While the UE 102 operates in the 5GMM-CONNECTED mode, the UE 102 receives 310 a command from the gNB 104 to handover to a target base station (e.g., ng-eNB 106). Particularly, the NR RRC entity 122 receives 310 the command from the gNB 104. In one embodiment, the gNB 104 includes layer configurations (e.g., that the RRC layer is EUTRA and the NAS layer is 5GMM) in a MobilityFromNRCommand and sends 310 the MobilityFromNRCommand to request handover of the UE 102 to the ng-eNB 106. Based on the MobilityFromNRCommand, the UE 102 determines that the gNB 104 and the ng-eNB 106 operate according to different RATs yet connect to the same CN 108. The MobilityFromNRCommand can also include a radio bearer configuration for the UE 102 to communicate with the ng-eNB 106, as will be further described in FIG. 8 below.

With continued reference to FIG. 3, after receiving 310 the MobilityFromNRCommand, the NR RRC entity 122 forwards 312 the configurations (e.g., in a RRCConnectionReconfiguration included in the MobilityFromNRCommand) to another entity of the UE 102 for controlling radio resources associated with a RAT according to which the ng-eNB 106 operates (e.g., EUTRA RRC entity 124), so that the EUTRA RRC entity 124 can apply 314 the configurations. The EUTRA RRC entity 124 in turn sends 316 an RRCConnectionReconfigurationComplete message to the ng-eNB 106, and subsequently sends 318 an RRC Connection Establishment indication to the 5GMM entity 126 indicating that the EUTRA RRC entity 124 successfully established a radio connection with the ng-eNB 106. Accordingly, the EUTRA RRC entity 124 is in EUTRA RRC_CONNECTED state 330 with the ng-eNB 106. The EUTRA RRC entity 124 also can send 332 a Handover Success message to the NR RRC entity 122 to inform the NR RRC entity 122 of a successful handover.

In response to receiving 332 the Handover Success message, the NR RRC entity 122 transitions to an RRC_IDLE state 334 and sends 340 a release indication (e.g., an RRC Connection Release message) to the 5GMM entity 126 indicating that the NR RRC entity 122 released a radio connection with the gNB 104. In turn, the 5GMM entity 126 continues to remain in 5GMM-CONNECTED state 350 (i.e., does not transition to the 5GMM-IDLE state) while the 5GMM entity 126 associates with the EUTRA RRC entity 124. In one implementation, the 5GMM entity 126 associates with the EUTRA RRC entity 124 after receiving 318 the RRC Connection Establishment indication from the EUTRA RRC entity 124. The 5GMM entity 126 optionally sets 319 a specific flag after receiving 318 the RRC Connection Establishment indication from the EUTRA RRC entity 124 to indicate that active radio resources are associated with the RAT according to which the ng-eNB 106 operates. The 5GMM entity 126 can use the flag to designate that the active RRC layer is the EUTRA RRC layer and not to transition to the 5GMM-IDLE state in response to the release indication. Accordingly, the 5GMM entity 126 can associate with the EUTRA RRC entity 124 in response to either the RRC Connection Establishment indication received 318 from the EUTRA RRC entity 124, or the flag. In another implementation, the 5GMM entity 126 associates with the EUTRA RRC entity 124 after receiving an RRC Connection Resume indication from the EUTRA RRC entity 124 (not shown to avoid clutter). The 5GMM entity 126 can optionally set a specific flag after receiving the RRC Connection Resume indication from the EUTRA RRC entity 124 to indicate that active radio resources are associated with the RAT according to which the ng-eNB 106 operates. The 5GMM entity 126 can use the flag to designate that the active RRC layer is the EUTRA RRC layer and not to transition to the 5GMM-IDLE state in response to the release indication.

After a period of time, the ng-eNB 106 sends 390 an RRCConnectionRelease message to the EUTRA RRC entity 124. The ng-eNB 106 can request that the UE 102 transition to RRC-idle or RRC-inactive mode in the RRCConnectionRelease message. In response to receiving 390 the RRCConnectionRelease message, the EUTRA RRC entity 124 transitions 392 to the RRC_IDLE state or the RRC_INACTIVE state accordingly. If the EUTRA RRC entity 124 transitions 392 to the RRC_IDLE state, the EUTRA RRC entity 124 sends 394 an RRC Connection Release message indicating that the EUTRA RRC entity 124 released the radio connection with the ng-eNB 106 to the 5GMM entity 126, which in turn transitions 398 to the 5GMM_IDLE state. If the EUTRA RRC entity 124 transitions 392 to the RRC_INACTIVE state, the EUTRA RRC entity 124 sends 394 an RRC Connection Suspension message to the 5GMM entity 126, which in turn transitions 398 to the 5GMM-CONNECTED state (i.e., the 5GMM entity 126 continues to remain in the 5GMM-CONNECTED state). The 5GMM entity 126 can reset (e.g., clear, delete) the flag discussed above after transitioning to the 5GMM-IDLE state or the 5GMM-CONNECTED state with an RRC inactive indication.

Figure 4:
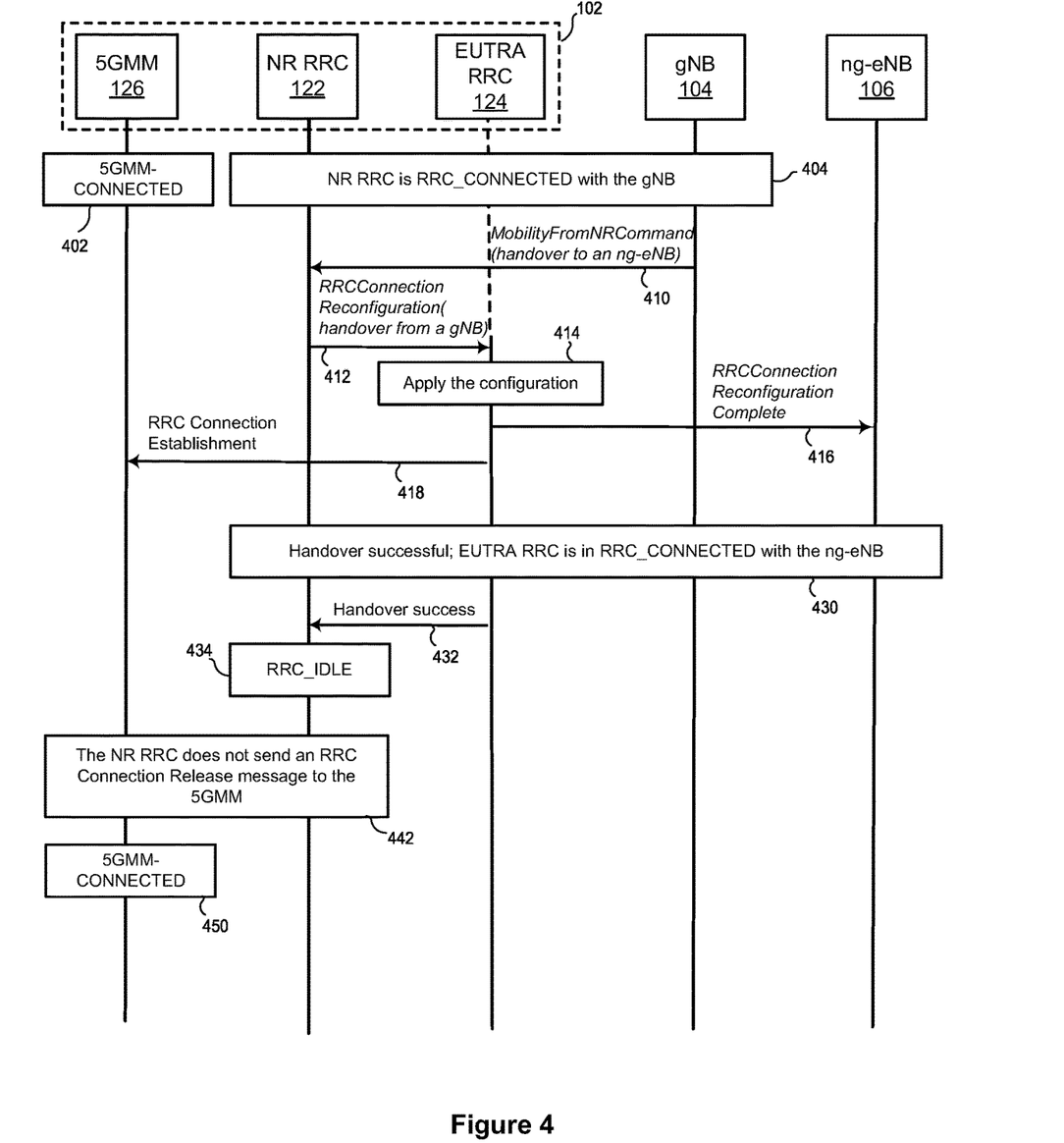
FIG. 4 is a messaging diagram of an example scenario in which an NR RRC entity operating in the UE of FIG. 1 determines that the UE should continue operating in the 5GMM-CONNECTED mode in response to successful completion of a handover from the gNB to the ng-eNB, and does not notify the 5GMM entity that a radio connection to the gNB has been released.

Now referring to FIG. 4, in this scenario the 5GMM entity 126 is in 5GMM-CONNECTED state 402, the NR RRC entity 122 is in NR RRC_CONNECTED state 404, the NR RRC entity 122 receives 410 a command (e.g., MobilityFromNRCommand including layer configurations and a radio bearer configuration) from the gNB 104 to handover to ng-eNB 106, and the NR RRC entity 122 forwards 412 the configurations (e.g., in a RRCConnectionReconfiguration included in the MobilityFromNRCommand) to the EUTRA RRC entity 124, so that the EUTRA RRC entity 124 can apply 414 the configurations, send 416 an RRCConnectionReconfigurationComplete message to the ng-eNB 106, and subsequently send 418 an RRC Connection Establishment indication to the 5GMM entity 126 (similar to the events 302, 304, 310, 312, 314, 316, and 318 discussed above). Accordingly, the EUTRA RRC entity 124 is in EUTRA RRC_CONNECTED state 430 with the ng-eNB 106, and can send 432 a Handover Success message to the NR RRC entity 122 to inform the NR RRC entity 122 of a successful handover (similar to the events 330 and 332 discussed above).

In response to receiving 432 the Handover Success message, the NR RRC entity 122 transitions to an RRC_IDLE state 434, but does not send a release indication indicating that the NR RRC entity 122 released a radio connection with the gNB 104 to the 5GMM entity 126 (event 442), in contrast to event 340 of FIG. 3. In turn, the 5GMM entity 126 continues to remain in 5GMM-CONNECTED state 450 (similar to the event 350 discussed above). After a period of time, the NR RRC entity 122 can send the release indication to the 5GMM entity 126, which in turn can transition to the 5GMM-IDLE state.

Figure 5:
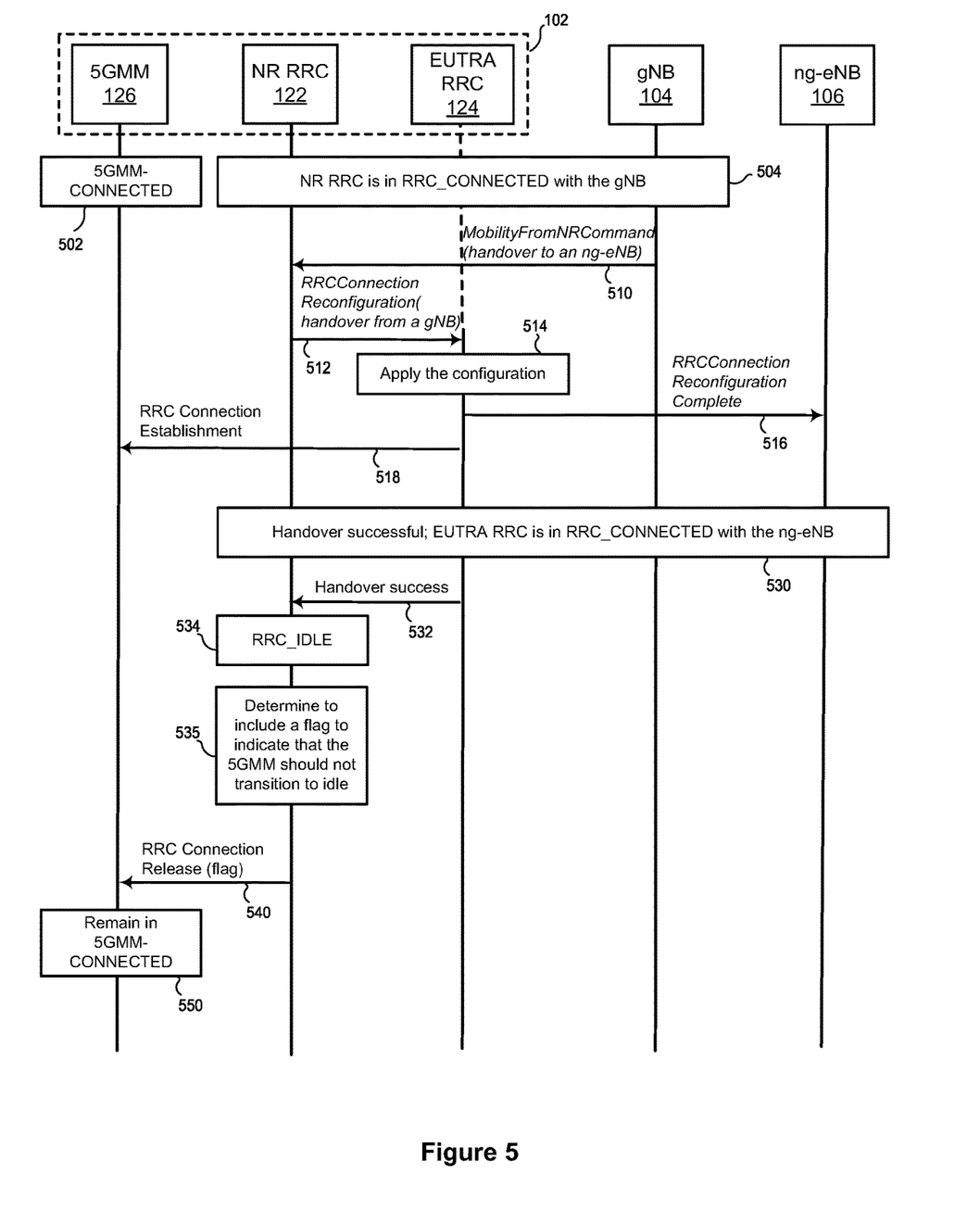
FIG. 5 is a messaging diagram of an example scenario in which an NR RRC entity operating in the UE of FIG. 1 notifies the 5GMM entity that a radio connection to the gNB has been released following a handover to the ng-eNB, and includes a flag in the notification to prevent the 5GMM entity from transitioning to the 5GMM-IDLE mode.

Now referring to FIG. 5, in this scenario the 5GMM entity 126 is in 5GMM-CONNECTED state 502, the NR RRC entity 122 is in RRC_CONNECTED state 504, the NR RRC entity 122 receives 510 a command (e.g., MobilityFromNRCommand including layer configurations and a radio bearer configuration) from the gNB 104 to handover to ng-eNB 106, and the NR RRC entity 122 forwards 512 the configurations (e.g., in a RRCConnectionReconfiguration in the MobilityFromNRCommand) to the EUTRA RRC entity 124, so that the EUTRA RRC entity 124 can apply 514 the configurations, send 516 an RRCConnectionReconfigurationComplete message to the ng-eNB 106, and subsequently send 518 an RRC Connection Establishment indication to the 5GMM entity 126 (similar to the events 302, 304, 310, 312, 314, 316, 318, 402, 404, 410, 412, 414, 416, and 418 discussed above). Accordingly, the EUTRA RRC entity 124 is in RRC_CONNECTED state 530 with the ng-eNB 106, and can send 532 a Handover Success message to the NR RRC entity 122 to inform the NR RRC entity 122 of a successful handover (similar to the events 330, 332, 430, and 432 discussed above).

In response to receiving 532 the Handover Success message, the NR RRC entity 122 transitions to an RRC_IDLE state 534 and sends 540 a release indication (e.g., an RRC Connection Release message) to the 5GMM entity 126 (similar to the events 334 and 340 discussed above). However, in this particular scenario, the NR RRC entity 122 includes 535 a flag in the RRC Connection Release message to indicate that the 5GMM entity 126 should not transition to the 5GMM-IDLE state. Alternatively, the NR RRC entity 122 can send an indication of the flag separate from the RRC Connection Release message. In turn, the 5GMM entity 126 continues to remain in 5GMM-CONNECTED state 450 (similar to the events 350 and 450 discussed above). After a period of time, the NR RRC entity 122 can send the release indication without the flag to the 5GMM entity 126, which in turn can transition to the 5GMM-IDLE state.

Figure 6:
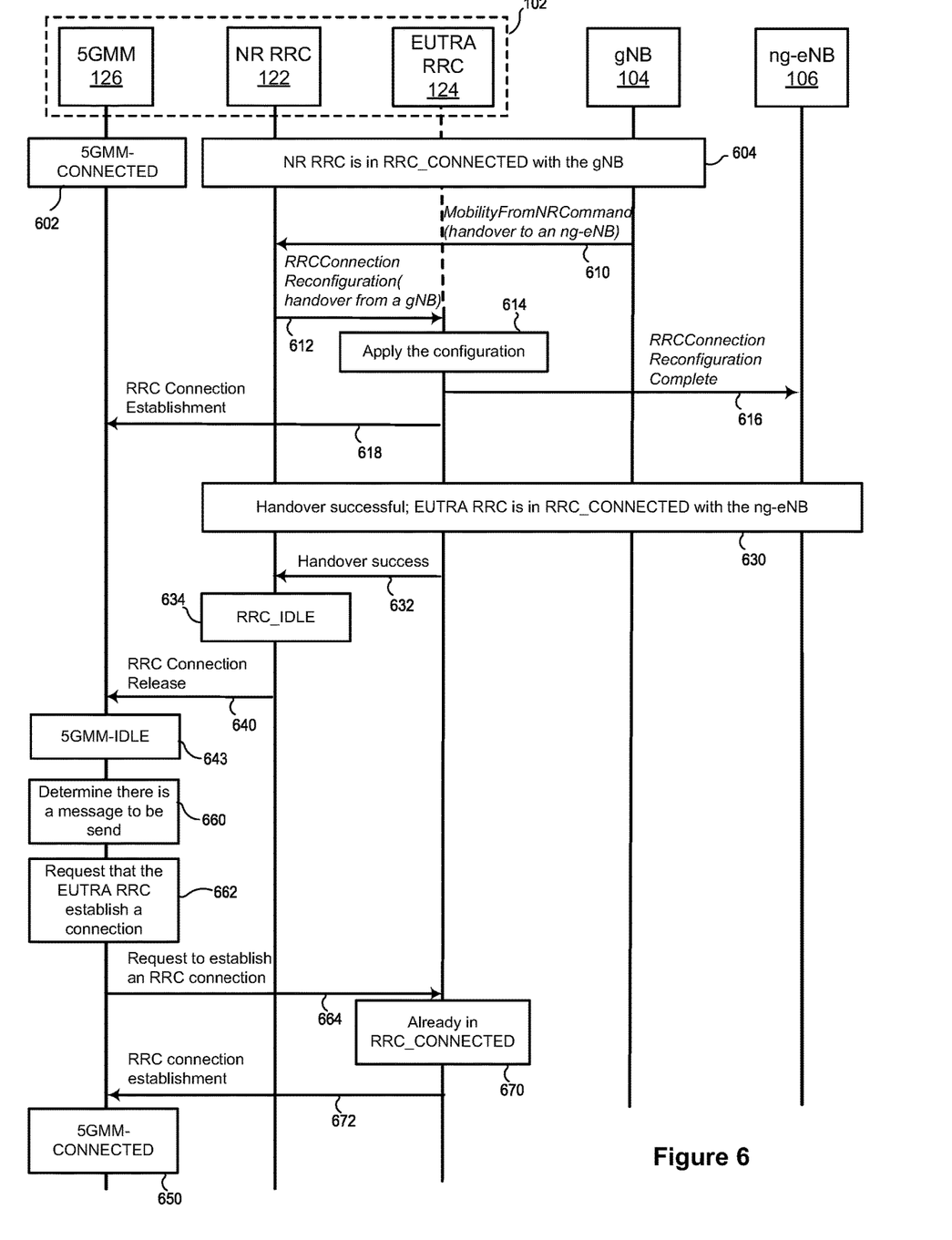
FIG. 6 is a messaging diagram of an example scenario in which the 5GMM entity operating in the UE of FIG. 1 transitions to the 5GMM-IDLE mode following a handover to the ng-eNB, and the EUTRA RRC entity notifies the MM entity that a radio connection has been established already in response to a request to establish an RRC connection.

Now referring to FIG. 6, in this scenario the 5GMM entity 126 is in 5GMM-CONNECTED state 602, the NR RRC entity 122 is in NR RRC_CONNECTED state 604, the NR RRC entity 122 receives 610 a command (e.g., MobilityFromNRCommand including layer configurations and a radio bearer configuration) from the gNB 104 to handover to ng-eNB 106, and the NR RRC entity 122 forwards 612 the configurations (e.g., in a RRCConnectionReconfiguration in the MobilityFromNRCommand) to the EUTRA RRC entity 124, so that the EUTRA RRC entity 124 can apply 614 the configurations, send 616 an RRCConnectionReconfigurationComplete message to the ng-eNB 106, and subsequently send 618 an RRC Connection Establishment indication to the 5GMM entity 126 (similar to the events 302, 304, 310, 312, 314, 316, 318, 402, 404, 410, 412, 414, 416, 418, 502, 504, 510, 512, 514, 516, and 518 discussed above). Accordingly, the EUTRA RRC entity 124 is in EUTRA RRC_CONNECTED state 630 with the ng-eNB 106, and can send 632 a Handover Success message to the NR RRC entity 122 to inform the NR RRC entity 122 of a successful handover (similar to the events 330, 332, 430, 432, 530, and 532 discussed above).

In response to receiving 632 the Handover Success message, the NR RRC entity 122 transitions to an RRC_IDLE state 634 and sends 640 a release indication (e.g., an RRC Connection Release message) to the 5GMM entity 126 (similar to the events 334, 340, 534, and 550 discussed above). However, in this particular scenario, the 5GMM entity 126 transitions to the 5GMM-IDLE state 643 in response to the release indication. After a period of time, when the 5GMM entity 126 determines 660 to send a message while in the 5GMM-IDLE state, the 5GMM entity 126 requests 662 that the EUTRA RRC entity 124 establish a radio connection. After receiving 664 an RRC connection request from the 5GMM entity 126, the EUTRA RRC entity 124 does not perform an RRC connection establishment procedure or an RRC connection resume procedure, and sends 672 an RRC Connection Establishment indication to 5GMM entity 126 while the EUTRA RRC entity 124 is in RRC_CONNECTED state 670. In turn, the 5GMM entity 126 transitions to 5GMM-CONNECTED state 650.

Figure 7:
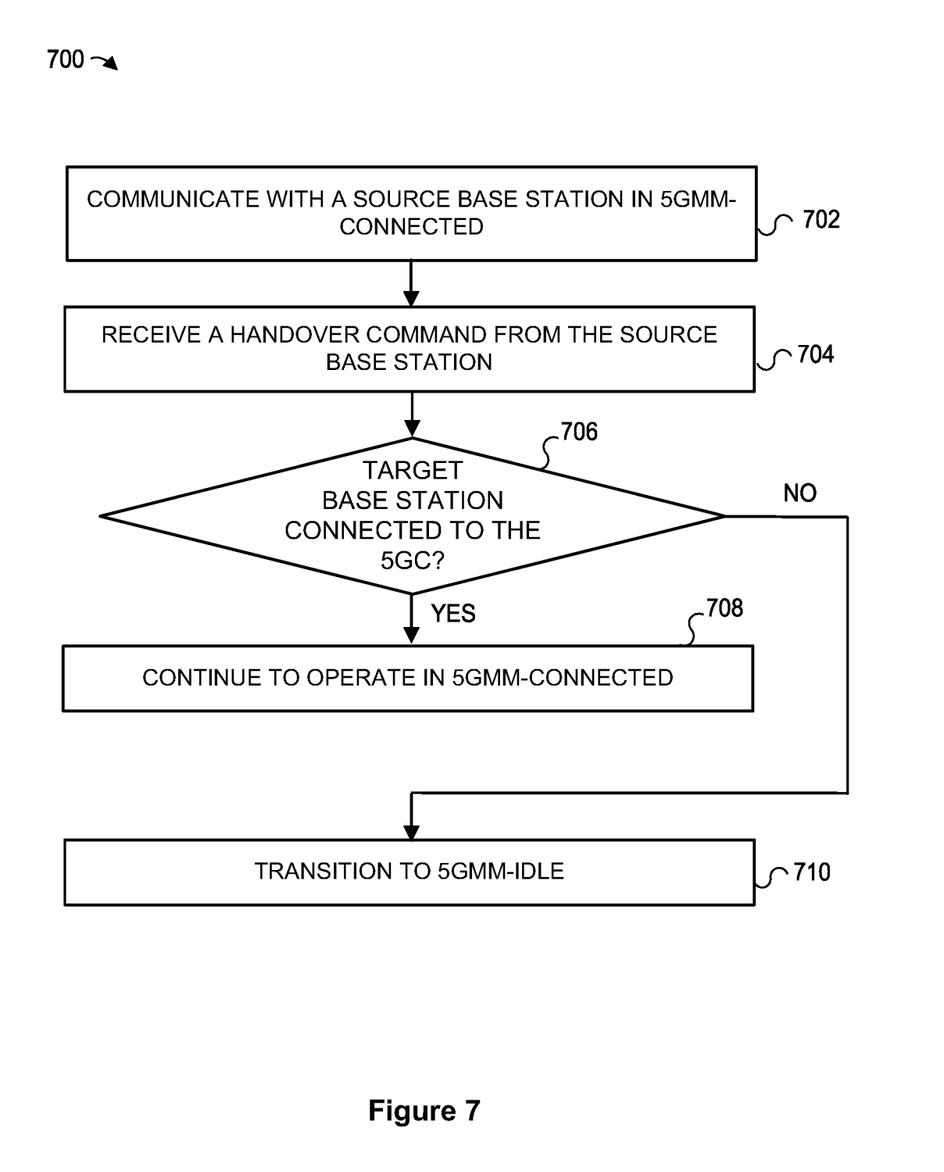
FIG. 7 is a flow diagram of an example method for determining whether the UE should transition to 5GMM-IDLE mode following a handover from a source base station to a target base station.

FIG. 7 is a flow diagram of an example method 700 for determining whether a UE should transition to 5GMM-IDLE mode following a handover from a source base station to a target base station. The method 700 can be implemented in the UE 102, and is discussed below with reference to the UE 102. However, the method 700 in general can be implemented in any suitable device.

At block 702, the UE 102 communicates messages with a source base station. The UE 102 at block 702 can initially operate in the 5GMM-CONNECTED state with the gNB 104 (see state 304 in FIG. 3, state 404 in FIG. 4, state 504 in FIG. 5, and state 604 in FIG. 6) or the ng-eNB 106.

At block 704, the UE 102 receives a command from the source base station to handover to a target base station, where the base stations are of different types (e.g., a gNB and an ng-eNB) coupled to the same CN (e.g., 5GC 108). If the source base station is the gNB 104, the handover command can configure handover from NR to EUTRA so that the UE 102 can communicate with the ng-eNB 106. If the source base station is the ng-eNB 106, the handover command configures handover from EUTRA to NR so that the UE 102 can communicate with the gNB 104.

Next, at block 706, if the UE 102 determines that the target base station is connected to the 5GC 108, the UE 102 at block 708 continues to operate in 5GMM-CONNECTED state after the handover (see the events 350, 450, and 550 in FIGS. 3-5). That is, the UE 102 does not perform a state transition after the handover. If the UE 102 at block 706 determines that the target base station is not connected to the 5GC (e.g., connected to the EPC), the UE 102 at block 710 transitions to the 5GMM-IDLE state. That is, the UE 102 transitions from the 5GMM-CONNECTED state to the 5GMM-IDLE state.

Figure 8:
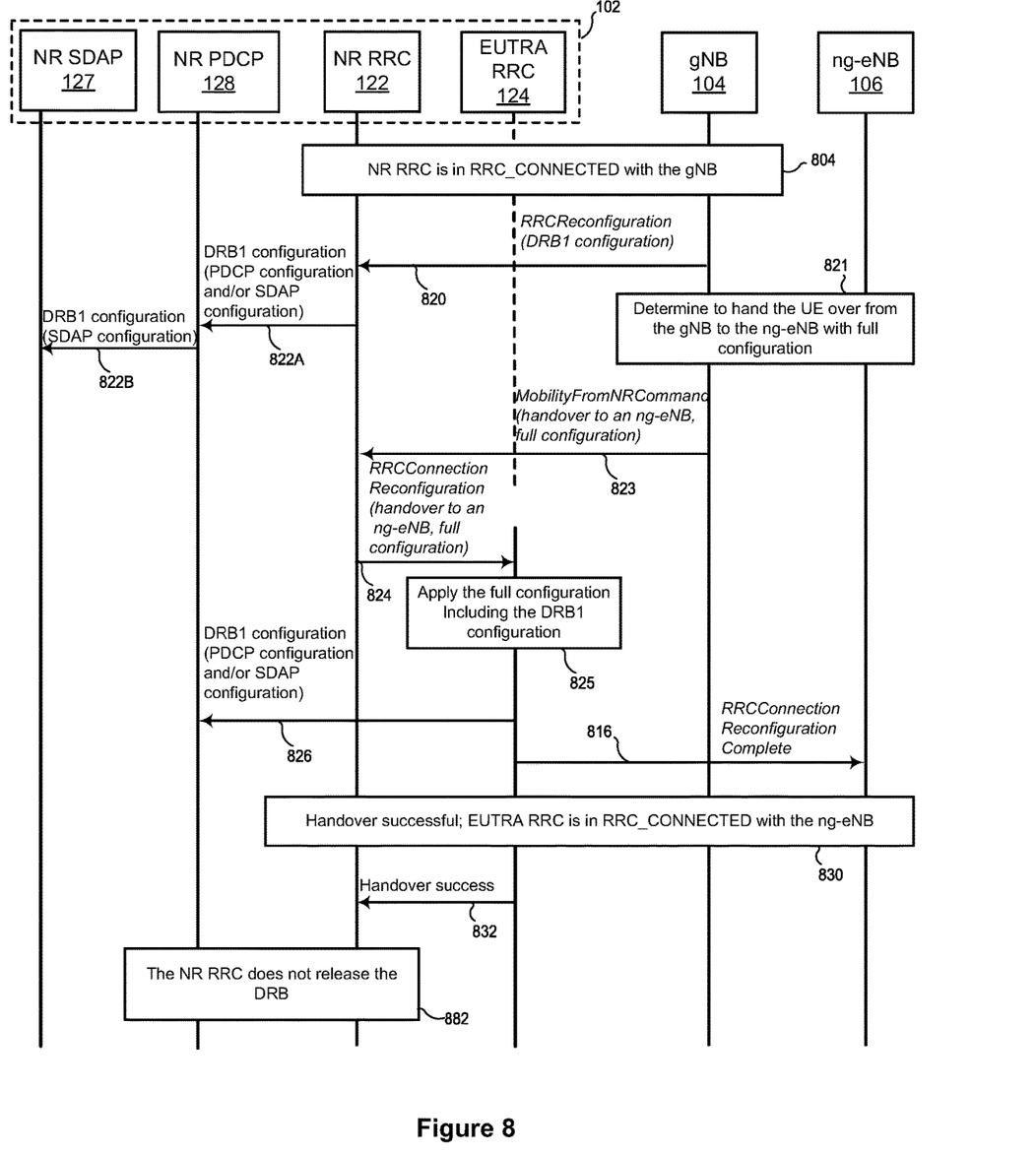
FIG. 8 is a messaging diagram of an example scenario in which a PDCP entity and an SDAP entity does not release a radio bearer after the UE completes a handover from a gNB to an ng-eNB and receives a full configuration for the radio bearer originally terminated at the gNB.

Now referring to FIG. 8, in this scenario the NR RRC entity 122 is in RRC_CONNECTED state 804 (similar to events 304, 404, 504, and 604 discussed above). While the UE 102 operates in the connected mode, the NR RRC entity 122 receives 820 a command (e.g., RRCReconfiguration) from the gNB 104, which specifies radio bearer configuration(s) for DRB1 (e.g., NR PDCP and/or NR SDAP configurations for DRB1). The NR RRC entity 122 in turn forwards 822A the radio bearer configuration(s) to the NR PDCP entity 128, so that the NR PDCP entity 128 can apply the radio bearer configuration(s) (e.g., the NR PDCP configuration). If the NR SDAP configuration for the DRB1 is included in the command, the NR RRC entity 122 in turn forwards 822B the radio bearer configuration(s) to the SDAP entity 127, so that the NR SDAP entity 127 can apply the radio bearer configuration(s) (e.g., the NR SDAP configuration).

After a period of time, the gNB 104 determines 821 to handover the UE 102 from the gNB 104 to the ng-eNB 106. The gNB 104 can include the radio bearer configuration(s) for DRB1 in a full configuration in the MobilityFromNRCommand message and send 823 the MobilityFromNRCommand message to the NR RRC entity 122. DRB1 can include a master cell group (MCG) data radio bearer (DRB), (ii) a secondary cell group (SCG) DRB, or (iii) a split DRB.

In response, the NR RRC entity 122 forwards 824 the full configuration (e.g., in a RRCConnectionReconfiguration) to the EUTRA RRC entity 124. According to the full configuration, the EUTRA RRC entity 124 applies 825 the radio bearer configuration(s) for DRB1 and further configures 826 the NR PDCP entity 128 with the radio bearer configuration(s) for DRB1. According to the full configuration, the EUTRA RRC entity 124 also configures 826 the NR SDAP entity 127 with the radio bearer configuration(s) for DRB1, if the NR SDAP configuration configures usage of an uplink SDAP header and/or a downlink SDAP header. If the NR SDAP configuration neither configures the uplink SDAP header nor the downlink SDAP header, the EUTRA RRC entity 124 in one implementation may not configure the NR SDAP entity 127 with the NR SDAP configuration, and the EUTRA RRC entity 124 or the NR RRC entity 122 may release the NR SDAP entity 127 after handover. If the NR SDAP configuration neither configures the uplink SDAP header nor the downlink SDAP header, the EUTRA RRC entity 124 in another implementation may still configure the NR SDAP entity 127 with the NR SDAP configuration, and the NR RRC entity 122 does not release the NR SDAP entity 127 after handover.

After applying the radio bearer configuration(s) for DRB1, the EUTRA RRC entity 124 sends 816 an RRCConnectionReconfigurationComplete message to the ng-eNB 106 (similar to events 316, 416, 516, and 616). Accordingly, the EUTRA RRC entity 124 is in EUTRA RRC_CONNECTED state 830 with the ng-eNB 106, and can send 832 a Handover Success message to the NR RRC entity 122 to inform the NR RRC entity 122 of a successful handover (similar to the events 330, 332, 430, 432, 530, 532, 630, and 632 discussed above).

In response to receiving 832 the Handover Success message, the NR RRC entity 122 does not release 882 the NR PDCP configuration and the NR SDAP configuration of the radio bearer configuration(s) for DRB1, and the NR PDCP entity 128 and the NR SDAP entity 127. If the NR RRC entity 122 does not receive the Handover Success message, the NR RRC entity 122 remains in the NR RRC_CONNECTED state and performs a NR RRC connection reestablishment procedure. If the NR RRC entity 122 fails to perform the NR RRC connection reestablishment procedure, the NR RRC entity 122 transitions to the NR RRC_IDLE state from the NR RRC_CONNECTED state.

The scenarios discussed above with respect to FIGS. 3-6 and 8 in some implementations may further involve the UE 102 receiving another command to handover to another target base station (e.g., an eNB) that is coupled to a different CN (e.g., EPC). In such implementations, the UE 102 can determine that the gNB 104 and the eNB connect to different CNs, and transition to the MM-idle mode after handover to the eNB is complete. In some implementations, the radio bearer configuration(s) discussed above may include a DRB configuration (e.g., DRB-ToAddMod information element) including the NR PDCP configuration (e.g., PDCP-Config information element) and/or the NR SDAP configuration (e.g., SDAP-Config information element).

Figure 9:
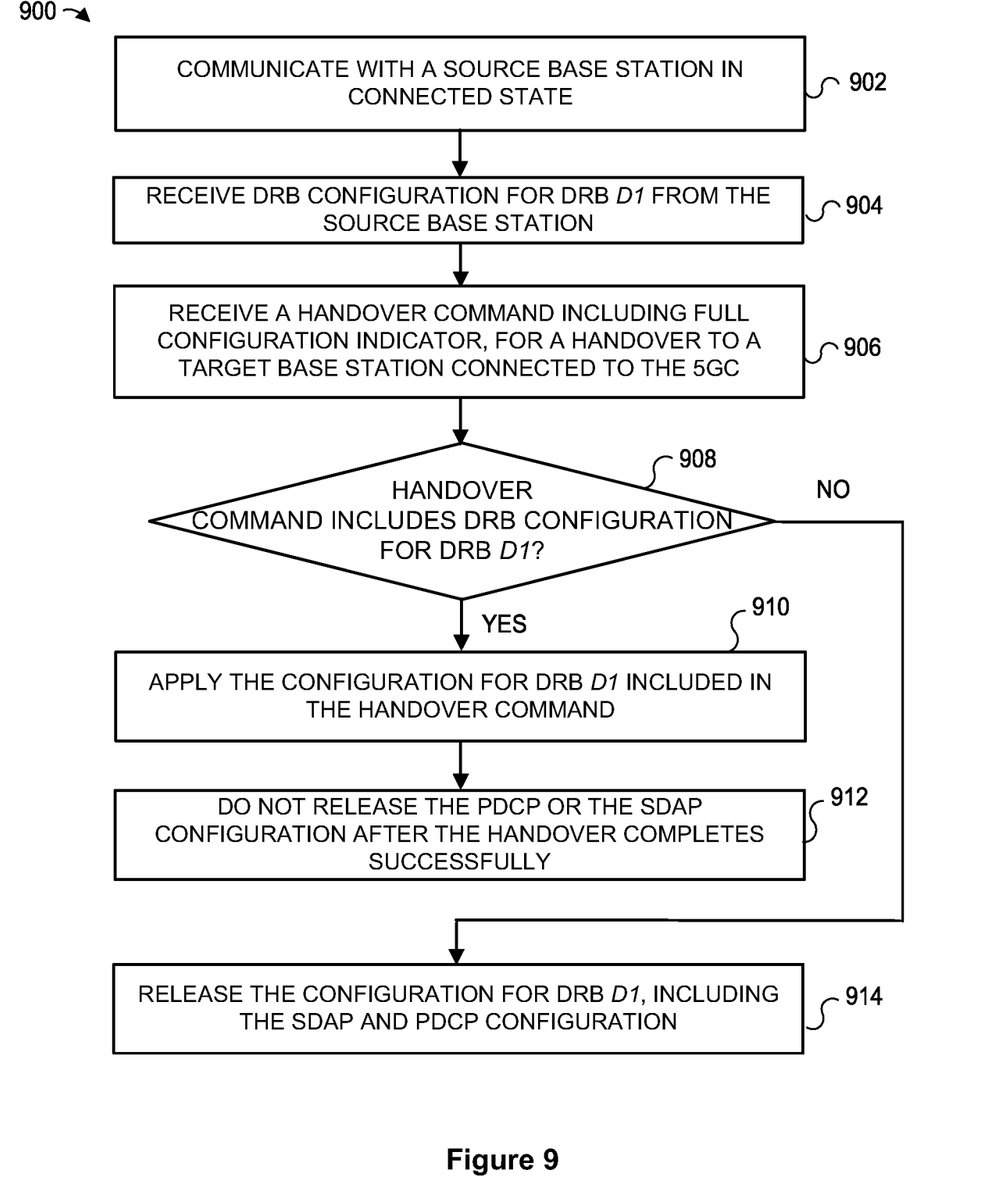
FIG. 9 is a flow diagram of an example method for determining whether the UE of FIG. 1 should release a radio bearer following a handover.

FIG. 9 is a flow diagram of an example method 900 for determining whether a UE should release a radio bearer following a handover. The method 900 can be implemented in the UE 102, and is discussed below with reference to the UE 102. However, the method 900 in general can be implemented in any suitable device.

At block 902, the UE 102 can initially operate in the connected state with the gNB 104 (see state 304 in FIG. 3, state 404 in FIG. 4, state 504 in FIG. 5, and state 604 in FIG. 6) or the ng-eNB 106.

At block 904, the UE 102 receives a DRB configuration for DRB D1 from the source base station (see event 820 in FIG. 8).

At block 906, the UE 102 receives a command from the source base station to handover to a target base station, where the base stations are of different types (e.g., a gNB and an ng-eNB) coupled to the same CN (e.g., 5GC 108). If the source base station is the gNB 104, the handover command can configure handover from NR to EUTRA so that the UE 102 can communicate with the ng-eNB 106. If the source base station is the ng-eNB 106, the handover command configures handover from EUTRA to NR so that the UE 102 can communicate with the gNB 104. The handover command can include a full configuration (e.g., designated by a full configuration indicator in the handover command) (see event 823 in FIG. 8).

In one implementation, if at block 908 the handover command includes a DRB configuration for the DRB D1 (e.g., DRB-ToAddMod information element) including a DRB identity of the DRB D1, and the DRB configuration for the DRB D1 includes a PDCP configuration and an SDAP configuration, the UE 102 at block 910 configures a PDCP entity for the DRB D1 according to the PDCP configuration and configures an SDAP entity for the DRB D1 according to the SDAP configuration. The UE 102 at block 912 subsequently does not release the PDCP entity and the SDAP entity after successfully handing over to the target base station. If at block 908 the handover command does not include a DRB configuration for the DRB D1, the UE 102 at block 914 releases the DRB configuration for the DRB D1 (i.e., release the DRB D1), including the PDCP configuration and the SDAP configuration. The UE 102 may release a PDCP entity and an SDAP entity associated to the DRB D1 to release the DRB D1.

In another implementation, if the UE 102 at block 902 that communicates messages with the source base station via at least two DRBs (e.g., D1, D2) receives a handover command that does not include a DRB configuration for the DRB D2 (e.g., DRB-ToAddMod information element) including a DRB identity of the DRB D2, the UE 102 releases the DRB D2 in response to the handover command. The UE 102 releases a PDCP entity and an SDAP entity associated to the DRB D2 to release the DRB D2. In another implementation, the handover command may include a DRB release configuration (e.g., DRB-ToReleaseList information element) configuring the UE 102 to release the DRB D2. In yet another implementation, the handover command may not include the DRB release configuration.

Figure 10:
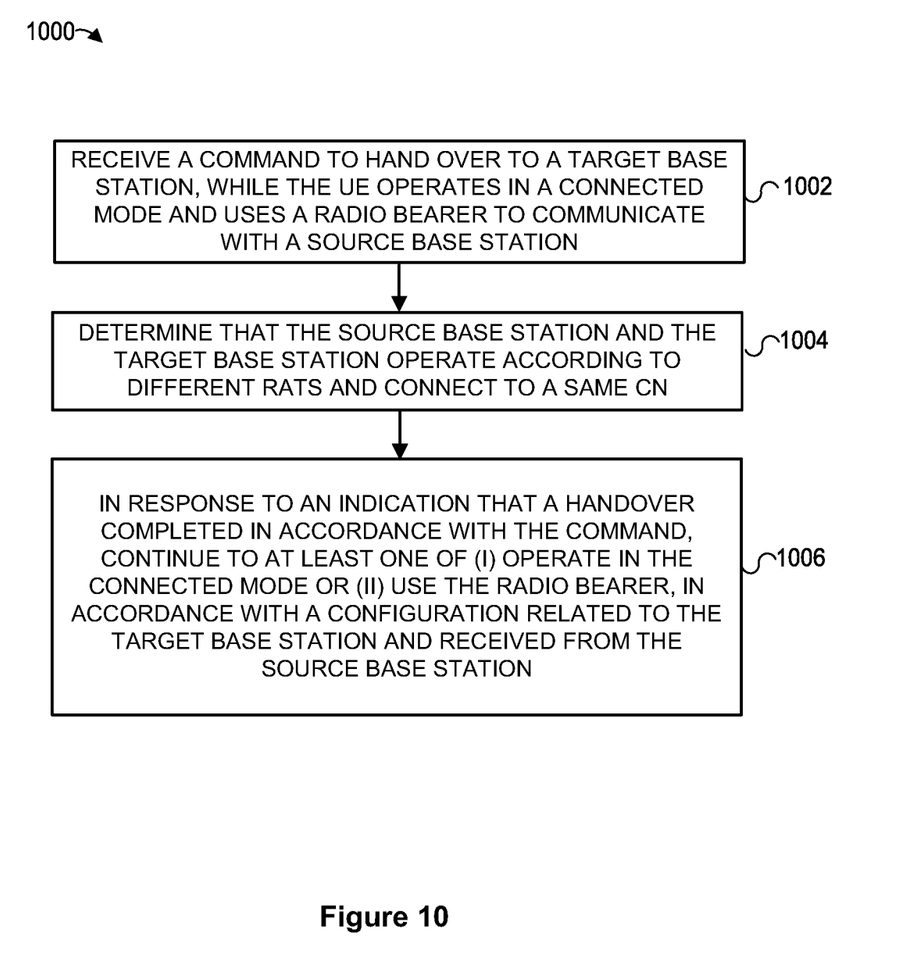
FIG. 10 is a flow diagram of an example method for handling mobility in the system of FIG. 1.

FIG. 10 depicts an example method 1000 for handling mobility between base stations, which the UE 102 can implement.

The method 1000 begins at block 1002, where the UE 102 receives, from a source base station, a command to hand over to a target base station, while the UE operates in a connected mode associated with an NAS entity or protocol such as MM (e.g., 5GMM) and communicates with the source base station via a radio bearer (blocks or events 310, 410, 510, 610, 704, 823, and 906 of FIGS. 3-9). The UE 102 at block 1004 determines that the source base station and the target base station operate according to different RATs and connect to a same CN.

In response to an indication that a handover completed in accordance with the command, the UE 102 at block 1006 continues to at least one of: (i) operate in the connected mode associated with an NAS entity or protocol such as MM (e.g., 5GMM) (blocks or events 350, 450, 550, 650, 708, and 808 of FIGS. 3-8), or (ii) use the radio bearer, in accordance with a configuration related to the target base station and received from the source base station (blocks 825 and 826 of FIG. 8).

The following additional considerations apply to the foregoing discussion.

Although the techniques discussed above indicate that the gNB 104 is the source base station and that the ng-eNB 106 is the target base station, similar techniques can apply when the UE 102 performs handover between a source base station (e.g., the ng-eNB 106) and a target base station (e.g., the gNB 104) both coupled to the 5GC 108, or between the source base station and another target base station coupled to a different CN (e.g., evolved packet core (EPC)). For example, if the source base station is the ng-eNB 106 and the target base station is the gNB 104 (i.e., handover from EUTRA to NR), the handover command is a MobilityFromEUTRACommand message. The MobilityFromEUTRACommand message may include a RRCReconfiguration message including the radio bearer configuration(s) or the DRB configuration.

Further, although the techniques are discussed above with example reference to EUTRA, NR, 5G NAS protocol entities, and 5GC, generally similar techniques can apply to other radio access technologies, protocols (e.g., 4G, 5G, and future standards), and/or CN technologies.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for handling mobility between base stations through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The following list of aspects reflects another additional embodiment explicitly contemplated by the present disclosure.

Aspect 1. A method in a UE for handling mobility between base stations includes receiving, by one or more processors from a source base station, a command to hand over to a target base station, while the UE operates in a mobility management (MM)-connected mode and communicates with the source base station via a radio bearer; determining, by the one or more processors, that the source base station and the target base station operate according to different RATs and connect to a same CN; and in response to an indication that a handover completed in accordance with the command, continuing to at least one of, by the one or more processors: (i) operate in the MM-connected mode, or (ii) use the radio bearer, in accordance with a configuration related to the target base station and received from the source base station.

Aspect 2. The method of aspect 1, further comprising: receiving the command to hand over at a first entity for controlling radio resources associated with a first RAT according to which the source base station operates; providing, by the first entity, handover information to a second entity for controlling radio resources associated with a second RAT according to which the target base station operates; and in response to determining that the handover was successful, transitioning the first entity to an RRC_IDLE state and the second entity to an RRC_CONNECTED state.

Aspect 3. The method of aspect 2, wherein continuing to operate in the MM-connected mode includes: receiving, at a mobility management (MM) entity for controlling mobility management of the UE, a release indication indicating that the first entity released a radio connection with the source base station, and not transitioning to an MM-idle mode in response to the release indication.

Aspect 4. The method of aspect 3, further comprising: prior to receiving the release indication, receiving, at the MM entity, an establishment indication indicating that the second entity successfully established a radio connection with the target base station; setting a flag to indicate that active radio resources are associated with the second RAT; and using the flag to determine that the MM entity is not to transition to the MM-idle mode in response to the release indication.

Aspect 5. The method of aspect 3, wherein the release indication is a first release indication, the method further comprising: subsequently to the receiving the first release indication, receiving, at the MM entity, a second release indication indicating that the second entity released the radio connection with the target base station; and transitioning to the MM-idle mode in response to the second release indication.

Aspect 6. The method of aspect 2, wherein continuing to operate in the MM-connected mode includes: receiving, at the first entity, an indication that the handover was successful; and not transmitting, from the first entity to the MM entity, a release indication indicating that the first entity released a radio connection with the source base station, in response to receiving the indication that the handover was successful.

Aspect 7. The method of claim 2, wherein continuing to operate in the MM-connected mode includes: receiving, at the first entity, an indication that the handover was successful; and transmitting, from the first entity to the MM entity, a release indication indicating that the first entity released a radio connection with the source base station, the release indication including an indication that the handover occurred between base stations operating according to different RATs and connected to a same CN.

Aspect 8. The method of aspect 2, wherein continuing to operate in the MM-connected mode includes: transitioning an MM entity for controlling mobility management of the UE to an MM-idle mode in response to a release indication indicating that the first entity released a radio connection with the source base station; subsequently to transitioning the MM entity to the MM-idle mode, transmitting a request to establish a radio connection with the target base station to the second entity; transmitting, from the second entity to the MM entity, an establishment indication indicating that the radio connection with the target base station is established; and transitioning the MM entity to the MM-connected mode in response to the establishment indication.

Aspect 9. The method of any of aspects 1-8, wherein the target base station is a first target base station, and the command to hand over to the first target base station is a first handover command that occurs in a first instance, the method further comprising: receiving, by the one or more processors in a second instance, a second command to hand over to a second target base station, while the UE operates in the MM-connected mode; determining, by the one or more processors, that the source base station and the second target base station connect to different CNs; and in response to an indication that a handover to the second target base station completed in accordance with the second command, transitioning to the MM-idle mode, by the one or more processors.

Aspect 10. The method of aspect 1, wherein the configuration related to the target base station includes a full configuration for the radio bearer, the method including receiving the full configuration for the radio bearer in the command to hand over to the target base station.

Aspect 11. The method of aspect 10, wherein receiving the full configuration for the radio bearer includes receiving at least one of a PDCP or a SDAP configuration.

Aspect 12. The method of aspect 11, the method further comprising: in response to the indication that the handover completed in accordance with the command, not releasing at least one of the PDCP configuration or the SDAP configuration.

Aspect 13. The method of aspect 10, wherein the radio bearer is one of (i) an MCG DRB, (ii) an SCG DRB, or (iii) a split DRB.

Aspect 14. The method of aspect 10, wherein continuing to use the radio bearer is further in response to determining that the configuration related to the target base station does not include a command to release the radio bearer.

Aspect 15. The method of aspect 10, wherein the radio bearer is a first radio bearer, the method further comprising: prior to receiving the command to hand over, communicating with the source base station via a second radio bearer; and releasing the second radio bearer in response to determining that the command to hand over does not include a configuration for the second radio bearer.

Aspect 16. The method of aspect 10, wherein the radio bearer is a first radio bearer, the method further comprising: prior to receiving the command to hand over, communicating with the source base station via a second radio bearer; and releasing the second radio bearer in response to determining that the command to hand over includes a command to release the second radio bearer.

Aspect 17. The method of aspect 15 or 16, wherein releasing the second radio bearer includes releasing a PDCP entity or an SDAP entity associated with the second radio bearer.

Aspect 18. The method of any of aspects 1-17, wherein: the MM entity comprises a 5GMM entity; the MM-connected mode is a 5GMM-CONNECTED mode; and the MM-idle mode is a 5GMM-IDLE mode.

Aspect 19. A UE comprising processing hardware and configured to implement a method of any of aspect 1-18.

Aspect 20. A communication network comprising: a first base station that operates according to a first RAT; a second base station that operates according to a second RAT; a CN connected to the first base station and the second base station; and a UE comprising hardware and configured to implement a method of any of aspects 1-19.

What is claimed is:

1. A method in a user equipment (UE) for handling mobility between base stations, the method comprising:
   receiving, by one or more processors from a source base station and at a first entity for controlling radio resources associated with a first RAT according to which the source base station operates, a command to hand over to a target base station while the UE operates in a mobility management (MM)-connected mode and communicates with the source base station via a radio bearer;
   determining, by the one or more processors, that the source base station and the target base station operate according to different radio access technologies (RATs) and connect to a same core network (CN);
   providing, by the first entity, handover information to a second entity for controlling radio resources associated with a second RAT according to which the target base station operates; and
   in response to determining that the handover was successful, transitioning the first entity to an RRC_IDLE state and the second entity to an RRC_CONNECTED state, and continuing, by the one or more processors, to operate in the MM-connected mode.

2. The method of claim 1, wherein continuing to operate in the MM-connected mode includes:
   receiving, at the first entity, an indication that the handover was successful; and
   not transmitting, from the first entity to the MM entity, a release indication indicating that the first entity released a radio connection with the source base station, in response to receiving the indication that the handover was successful.

3. The method of claim 1, wherein the target base station is a first target base station, and the command to hand over to the first target base station is a first handover command that occurs in a first instance, the method further comprising:
   receiving, by the one or more processors in a second instance, a second command to hand over to a second target base station, while the UE operates in the MM-connected mode;
   determining, by the one or more processors, that the source base station and the second target base station connect to different CNs; and
   in response to an indication that a handover to the second target base station completed in accordance with the second command, transitioning to the MM-idle mode, by the one or more processors.

4. The method of claim 1, wherein the configuration related to the target base station includes a full configuration for the radio bearer, the method including receiving the full configuration for the radio bearer in the command to hand over to the target base station.

5. The method of claim 4, wherein receiving the full configuration for the radio bearer includes receiving at least one of a Packet Data Convergence Protocol (PDCP) or a Service Data Adaption Protocol (SDAP) configuration.

6. The method of claim 5, wherein the radio bearer is one of (i) a master cell group (MCG) data radio bearer (DRB), (ii) a secondary cell group (SCG) DRB, or (iii) a split DRB.

7. The method of claim 1, wherein:
   the MM entity comprises a 5GMM entity;
   the MM-connected mode is a 5GMM-CONNECTED mode; and
   the MM-idle mode is a 5GMM-IDLE mode.

8. The method of claim 1, wherein:
the source base station operates according to a more advanced RAT, and the target base station operates according to a less advanced RAT.

9. The method of claim 8, wherein:
the source base station operates according to 5G NR, and the target base station operates according to EUTRA.

10. The method of claim 1, wherein command to hand over includes a MobilityFromNRCommand.

11. A UE comprising processing hardware and configured to:
receive, from a source base station and at a first entity for controlling radio resources associated with a first RAT according to which the source base station operates, a command to hand over to a target base station while the UE operates in a mobility management (MM)-connected mode and communicates with the source base station via a radio bearer;
determining, by the one or more processors, that the source base station and the target base station operate according to different radio access technologies (RATs) and connect to a same core network (CN);
providing, by the first entity, handover information to a second entity for controlling radio resources associated with a second RAT according to which the target base station operates; and
in response to a determination that the handover was successful transitioning the first entity to an RRC_IDLE state and the second entity to an RRC_CONNECTED state, and continuing to operate in the MM-connected mode.

12. The UE of claim 11, wherein to continue to operate in the MM-connected mode, the processing hardware is configured to:
receive, at the first entity, an indication that the handover was successful, and
not transmit, from the first entity to the MM entity, a release indication indicating that the first entity released a radio connection with the source base station, in response to receiving the indication that the handover was successful.

13. The UE of claim 11, wherein the target base station is a first target base station, and the command to hand over to the first target base station is a first handover command that occurs in a first instance, and the processing hardware is further configured to:
receive, in a second instance, a second command to hand over to a second target base station, while the UE operates in the MM-connected mode,
determine, that the source base station and the second target base station connect to different CNs, and
in response to an indication that a handover to the second target base station completed in accordance with the second command, transition to the MM-idle mode.

14. The UE of claim 11, wherein the configuration related to the target base station includes a full configuration for the radio bearer, the processing hardware further configured to:
receive the full configuration for the radio bearer in the command to hand over to the target base station.

15. The UE of claim 11, wherein to receive the full configuration for the radio bearer, the processing hardware is configured to:
receive at least one of a Packet Data Convergence Protocol (PDCP) or a Service Data Adaption Protocol (SDAP) configuration.

16. The UE of claim 15, wherein the radio bearer is one of (i) a master cell group (MCG) data radio bearer (DRB), (ii) a secondary cell group (SCG) DRB, or (iii) a split DRB.

17. The UE of claim 11, wherein:
the MM entity comprises a 5GMM entity;
the MM-connected mode is a 5GMM-CONNECTED mode; and
the MM-idle mode is a 5GMM-IDLE mode.

18. A communication network comprising:
a first base station that operates according to a first RAT;
a second base station that operates according to a second RAT;
a CN connected to the first base station and the second base station; and
a UE comprising hardware and configured to:
receive, from the first base station and at a first entity for controlling radio resources associated with a first RAT according to which the source base station operates, a command to hand over to the second base station while the UE operates in a mobility management (MM)-connected mode and communicates with the first base station via a radio bearer,
determine that the first base station and the second base station operate according to different RATs and connect to the same CN,
provide, by the first entity, handover information to a second entity for controlling radio resources associated with a second RAT according to which the target base station operates, and
in response to a determination that the handover was successful, transition the first entity to an RRC_IDLE state and the second entity to an RRC_CONNECTED state, and continue to operate in the MM-connected mode.

* * * * *